United States Patent [19]
Sigg et al.

[11] 4,246,795
[45] Jan. 27, 1981

[54] CONTACT SENSING HEAD

[75] Inventors: Hans Sigg, Neuchâtel; Robert Viret, Lausanne; Heinz Wegmann, Colombier, all of Switzerland

[73] Assignee: Meseltron S.A., Corcelles, Switzerland

[21] Appl. No.: 942,787

[22] Filed: Sep. 15, 1978

[30] Foreign Application Priority Data

Sep. 27, 1977 [CH] Switzerland ............... 11758/77

[51] Int. Cl.³ ........................................... G01H 13/00
[52] U.S. Cl. .................................................. 73/651
[58] Field of Search ............... 73/651, 649, 658, 634, 73/579; 340/1 R, 6 R, 16 R

[56] References Cited

U.S. PATENT DOCUMENTS

| 3,955,404 | 5/1976 | Bickel et al. ............ 73/579 |
| 3,958,450 | 5/1976 | Kleesattel ................ 73/579 |

FOREIGN PATENT DOCUMENTS

| 2551361 | 6/1976 | Fed. Rep. of Germany . |
| 2611781 | 10/1976 | Fed. Rep. of Germany . |
| 2235351 | 1/1975 | France . |
| 896491 | 5/1962 | United Kingdom . |
| 932069 | 7/1963 | United Kingdom . |
| 967180 | 8/1964 | United Kingdom . |
| 1013186 | 12/1965 | United Kingdom . |
| 1036817 | 7/1966 | United Kingdom . |
| 1087475 | 10/1967 | United Kingdom . |
| 1260537 | 10/1971 | United Kingdom . |
| 1447613 | 8/1976 | United Kingdom . |

*Primary Examiner*—Stephen A. Kreitman
*Attorney, Agent, or Firm*—Sherman & Shalloway

[57] ABSTRACT

A contact sensing head, for example for a measuring device, comprises a sensor having a free end which is vibrated at low amplitude by a motor at the resonant frequency of the sensor. A transducer senses the vibrations and feeds a signal to an electronic detection system. When the sensor contacts an object, the frequency and amplitude of its oscillation changes. This is picked up by the electronic detection system, which signals that contact has been made.

28 Claims, 15 Drawing Figures

CONTACT SENSING HEAD

BACKGROUND OF THE INVENTION

The present invention relates to a contact sensing head and is particularly, but not exclusively, related to a sensing head for a measuring device operable to detect the position of the points in space with regard to which mechanical contact takes place between a sensor of the sensing head and an object to be measured.

Such measuring devices may be operated by securing the object on a mobile workpiece-carrying table and by moving the points to be measured into the region of the sensing head, which is capable of locating them with a desired degree of precision relative to a reference origin. When the positions of the sensing head itself and of the table have been determined by the measuring system of the machine relative to a common reference origin and according to selected coordinate axes, it is an easy matter to deduce therefrom, by calculation, the positions of the aforementioned points measured relative to the said origin.

There are measuring heads which supply an "all or nothing" electrical signal as soon as mechanical contact is established, at the point to be measured, between the sensor and the object. In this case, in order to ascertain the position of the point of contact, the procedure is to utilise the said electrical signal for "recording in flight" or "fixing" the coordinates indicated by the measuring system of the machine at the instant of contact, and to add to the said coordinates the constants due to the geometrical form of the sensor.

In known embodiments of such measuring heads, generation of the electrical signal takes place by employing the following processes:

The mechanical contact establishes an electrical current between the sensor and the object;

Electrical contact or contacts establishing the signal are actuated by the sensor; they are frequently mounted on guides having a zero degree of freedom and maintained by springs (see German Patent Specification No. 25 51 361 and British patent specification No. 1,447,613);

The sensor actuates an element the position of which is detected by magnetic, capacitive or photoelectrical means producing an analog voltage approximately proportional to the displacement of the said element (German Patent Specification No. 26 11 781);

The useful signal of the "all or nothing" type is produced by a voltage comparator during passage to zero of the said analog voltage;

A strain gauge system of the resistance wire or semiconductor type is fixed on the sensor itself or on a support thereof, constituted for example by flexible blades; it converts the deformation of the sensor or of its support on contact with the object to a proportional analog voltage (French Patent Specification No. 73 23 193, publication No. 2 235 351); as in the preceding case, the passage to zero of the said voltage is located by a voltage comparator which produces an all or nothing signal; these systems generally have the following defects:

1. Non-constant quality of electrical contact
2. Vibration of the electrical contact
3. Lack of rigidity, fragility
4. Precision of measurement which is a function of the length of the sensor.

British patent specification No. 932069 relates to a sensor constituted by a piezoelectrical crystal vibrating at its resonant frequency and maintained at this frequency by an oscillating circuit. Application of the said sensor is limited to that of signalling the advance of the cutting tool of a lathe. The said sensor reveals the instant of passage of the tool, coming always from the same direction. Such an embodiment cannot be envisaged for universal application as in a measuring head, in which case the direction in which measurement is effected is optional but precision of measurement must remain non-variable. Furthermore, in the British patent specification No. 932069, the sensor itself is constituted by the piezoelectric crystal and this construction makes it extremely fragile and vulnerable to untimely shocks.

SUMMARY OF THE INVENTION

The subject of the present invention is a contact sensing head which first of all is reliable and wherein the contact with an object to be measured reliably supplies a signal. False signals are not produced on liberation of the mechanical contact with the object to be measured or in the event of sudden movement of the sensing head. The sensing head according to the invention is also robust and as precise as the known and economical measuring heads.

According to the present invention there is provided a contact sensing head comprising:

a sensor having a free end which is able to vibrate at a resonant frequency of the sensor;

a motor operable to cause said free end to vibrate at low amplitude at said resonant frequency; and a transducer for sensing the vibrations of said sensor, said transducer being connected to an electronic detection system.

The motor may be of the electromagnetic, piezoelectric or electro-dynamic type.

Similarly, the transducer which transforms the mechanical oscillation of the sensor into an electrical signal may be of the electromagnetic, piezoelectric or electro-dynamic type.

The oscillation of the sensor may be self-sustaining, by amplifying the voltage emitted by the transducer in an electronic amplifier and transmitting it to the motor with the appropriate phase. Another mode of proceeding is to feed the motor either from a generator tuned to the frequency of the sensor itself, or from a generator synchronised with the intrinsic frequency of the sensor.

The system of electronic detection may signal the disturbance of one of the physical variables of the oscillation of the sensor; either the amplitude or the frequency thereof.

Depending on the motor employed, it will be possible to impress on the sensor either a planar oscillation or a rotary movement.

The sensing head according to the invention may be carried into effect in accordance with four different embodiments. According to a first variant, the motor and the transducer are secured to a support of the sensor. According to a second variant, the motor and the transducer are secured to the sensor itself. According to a third variant, the motor is fixed to a support of the sensor and only the transducer is fixed to the sensor.

According to the fourth variant, the motor and the transducer are fixed to a support of the sensor and an additional transducer is fixed to the sensor itself.

The sensing head may be constructed in such manner that the sensor is rigidly connected to a portion of a Boys support. The Boys support is itself maintained in equilibrium under the influence of a helical compression spring.

The sensing head may comprise a system for wireless transmission of an output signal utilising either radioelectric waves or an optical system, or an ultrasound system.

The invention also relates to a process for putting into operation the sensing head wherein said sensor is vibrating at said resonant frequency and enters into mechanical contact with an object to be sensed, said transducer senses a disturbance in said vibrations produced by said mechanical contact, and the said electronic detection system receives a disturbed signal from said transducer and provides an indication of the instant of contact.

Functioning of the sensing head may be such that the electronic detection system associated with the transducer detects a variation of the oscillation frequency when the sensor enters into mechanical contact with the object to be measured. Functioning may also or alternatively be such that the electronic detection system detects a variation of the amplitude of the oscillation.

In sensing heads according to the third and fourth embodiments mentioned previously, the disturbed signal emitted by the transducer on the sensor is an increasing voltage. In these cases, the electronic detection system may indicate the passing through an upper threshold of this voltage.

The advantages of the sensing head according to the invention are numerous.

Primarily, it has high sensitivity due to the detection system. Its good operation is not subject to the not very reliable functioning of an electrical contact which could become soiled, jammed or deformed.

Further, it is not subject to the disadvantages of heads having static sensors which might commence to vibrate slightly when they are no longer in contact with the object to be measured, thereby supplying false signals. Employing the sensing head according to the invention, detection of the instant of contact is quite unequivocal.

The construction of the sensing head according to the invention imparts thereto the desired rigidity and the robustness for withstanding even violent impacts on the sensor, resulting in the spring giving way under the effect of untimely stresses.

The measurement precision supplied by the sensing head depends only to a slight extent on the length of the sensor. Furthermore, measurement does not in any way depend on the temperature. There are no contacts which could be subject to thermal expansions.

The measurement precision is very great. In general, the amplitude of the vibrations at the free end of the sensor according to the first embodiment is of the order of ±0.1 μm, which permits measurement precision of the head close to ±1 μm. In fact, the assembly comprising the sensor, the motor and the transducer may be very solidly constructed and the use of a Boys support, blocking the 6 degrees of freedom, provides accurate placing in position.

Manufacture is simple: the number of components is not very great and there need be no very precise machining, even with regard to the Boys support.

BRIEF DESCRIPTION OF THE DRAWINGS

For a better understanding of the invention and to show how it may be put into effect reference will now be made, by way of example, to the accompanying drawings, in which:

FIGS. 10a, 10b and 10c illustrate the case wherein circular movement is imparted to the sensor. FIGS. 10a and 10b are views in plan and in section of a motor M and FIG. 10c gives a diagram of a three-phase electronic generator, the feedback voltage of which is electrically generated.

DETAILED DESCRIPTION OF THE DRAWINGS

Referring to FIGS. 1, 4, 6 and 7, the measuring head comprises a support S permitting securing the head to a measuring device or machine, and an end face F with an annulus on which the fixed portion S2 of the Boys support engages.

The mobile portion S1 of the Boys support is held in position by the spring R the force of which counterbalances the effect of contact pressure of the sensor P on any external object. The spring R thus prevents the mobile portion S1 of the Boys support from rocking on its balls, if the said contact pressure is lower than a predetermined value. For as long as the supports S1 and S2 are maintained one against the other by the spring R they constitute an assembly the 6 degrees of freedom of which are blocked. In the event of rocking, the spring R has the task of restoring the equilibrium of the two supports one against the other.

Figures 1, 3:
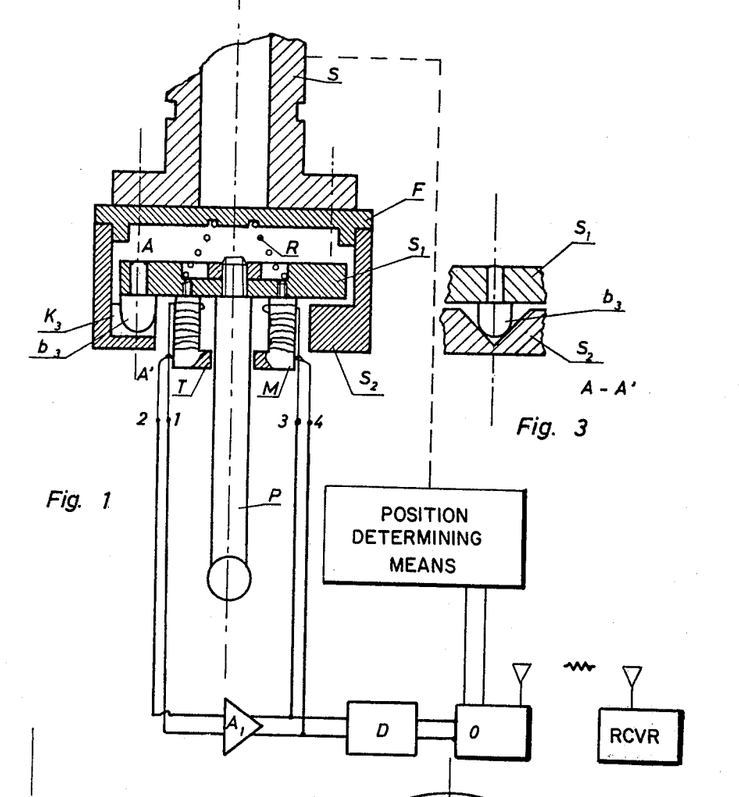
FIG. 1 is a longitudinal section through a measuring head according to the invention, comprising a motor and a transducer disposed in the measuring head itself. It also shows the block diagram of an amplifier system A1 for use in bringing about damping and maintenance of the oscillations of a sensor P, and also in detection of the oscillations with respect to amplitude or amplitude and frequency by an electronic detection system D.
FIG. 3 is the section A—A' of FIG. 2b.
Figure 2A:
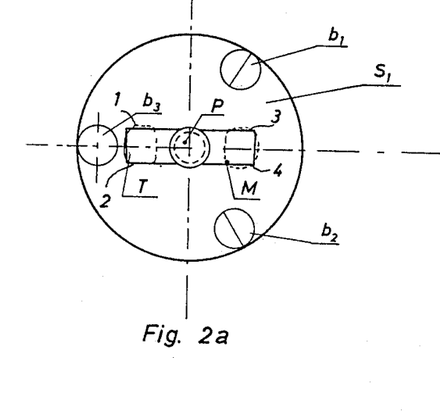
FIG. 2a is an underneath view of the mobile portion S1 of a Boys support, as described for example in "Métrologie Générale", of Messrs. Bassière and Gaguebet, page 400 Ed. Dunod 1966. The sensor P, a motor M and a transducer T are indicated.
Figure 2B:
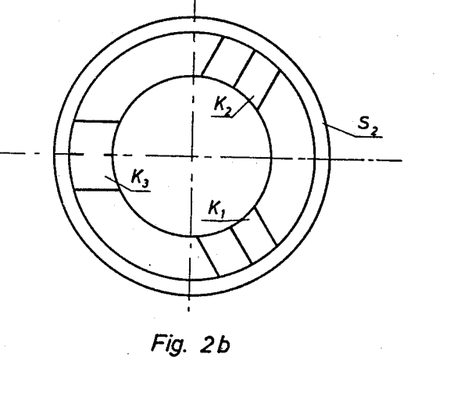
FIG. 2b is a plan view of the fixed portion S2 of the Boys support. When the supports S1 and S2 are mounted in such manner as to constitute a zero degree of freedom system, half-balls $b_1$, $b_2$, $b_3$ are engaged in prismatic grooves $k_1$, $k_2$, $k_3$ as the section A—A' of FIG. 3 indicates, and the assembly is maintained in equilibrium by a spring R.

In the embodiment shown in FIG. 1, the motor M is an electromagnet and the transducer T is a magnetised bar supporting a coil. A1 is an electronic amplifier. The assembly constituted by the motor M and the transducer T makes it possible to oscillate the sensor P at its resonant frequency with the aid of the amplifier A1.

In fact, if a voltage of sinusoidal form is applied to the terminals 3 and 4 of the motor M at the mechanical resonant frequency of the sensor P, the latter commences to vibrate. The variations of magnetic flux resulting therefrom in the transducer T bring about induction of a voltage at its terminals 1 and 2.

This latter voltage is utilised as a feedback voltage and, subsequent to amplification in the amplifier A1, with suitable phase, it produces the voltage across the terminals 3 and 4, thus closing the feedback loop.

As soon as the sensor P contacts an object, the oscillation is disturbed, its frequency changes, it is dampened and then stops. The electronic detection system D supplies a signal to an output O. As the pressure on the sensor P increases, the support S1 rocks on its ball through an angle determined by the amplitude of the movement of the sensor P.

As soon as the sensor P is disengaged, the support S1 returns into position due to the spring R and the sensor P oscillates once again. In general, the head is ready for a fresh sensing operation approximately 50 ms subsequent to having been disengaged.

Figure 4:
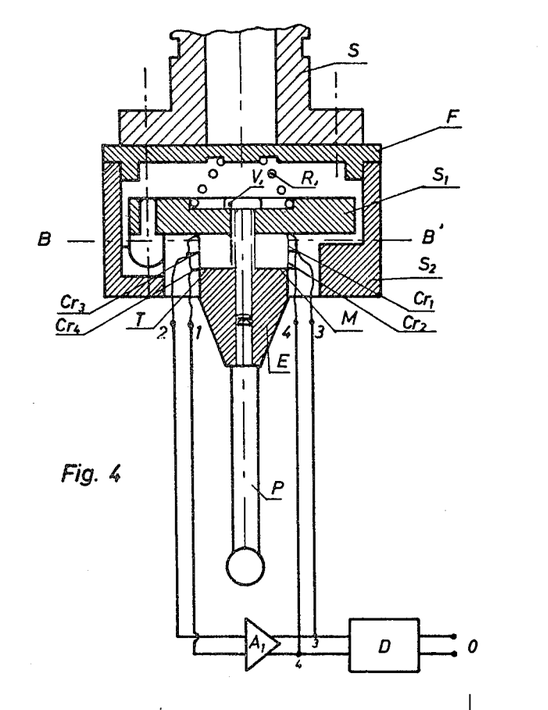
FIG. 4 is a longitudinal section through a measuring head according to the invention, comprising a motor M and a transducer T, both piezoelectric and disposed in a housing of the measuring head.
Figure 5A:
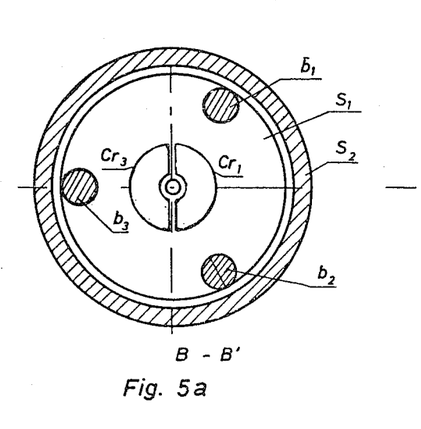
FIG. 5a is an underneath view of the mobile portion S1 of the Boys support of FIG. 4.
Figure 5B:
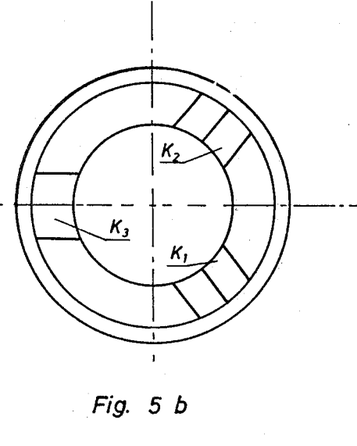
FIG. 5b shows a plan view of the fixed portion S2 of the Boys support of FIG. 4.

The embodiment according to FIGS. 4 and 5 employs as motor M piezoelectric crystal sandwiches Cr1 and Cr2 of opposite polarity, whereas the transducer T is formed by piezoelectric sandwiches Cr3 and Cr4 also of opposite polarity. These crystals are gripped with a pre-determined degree of prestressing by a screw V between a nut E and the support S1.

FIG. 5a shows a section B—B' in which appears the mobile portion S1 of the Boys support carrying balls $b_1$, $b_2$, $b_3$, and also a face of the piezoelectric crystals Cr1 and Cr3. FIG. 5 shows the fixed support S2 which is identical with that of FIG. 1.

If the terminals 3 and 4 are fed with a sinusoidal voltage the frequency of which corresponds to that of the mechanical resonance of the sensor P, the piezoelectric effect produces thickness variations of the motor crystal sandwiches Cr1 and Cr2 in the rhythm of the said frequency and sets the sensor P in vibration. The mechanical pressures resulting therefrom in the crystal sandwiches Cr3 and Cr4 of the transducer T cause an electric voltage to appear across the terminals 1 and 2. This electric voltage (as in the case of the electromagnetic system), employed as a feedback voltage, is amplified in the amplifier A1 with suitable phase, so as to supply voltage to the terminals 3 and 4.

Contact detection is effected in the same manner by the detector D and with the same properties as with the electromagnetic system described hereinbefore.

Figure 6:
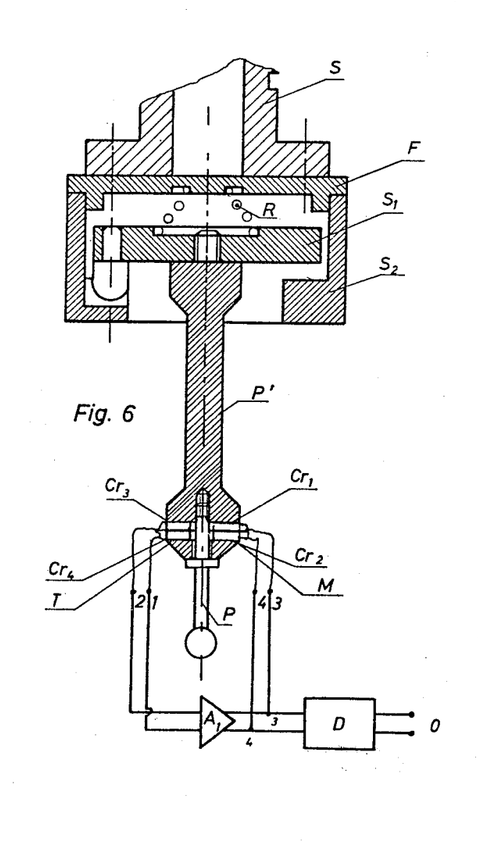
FIG. 6 is a longitudinal section through a measuring head according to the invention, comprising a motor M and a transducer T, both piezoelectric, at the end of a rod P' carrying a sensor P.

The embodiment of FIG. 6 comprises the same type of elements as that of FIG. 4, but with the object of obtaining a sensor which is as long as possible, whilst preserving high vibration frequency and, consequently, a short response time, the motor/transducer assembly has been mounted on a rod P'. Starting from this location, the sensor is prolonged at P. This short and light portion has a high resonant frequency and thus high frequency vibration.

Figure 7:
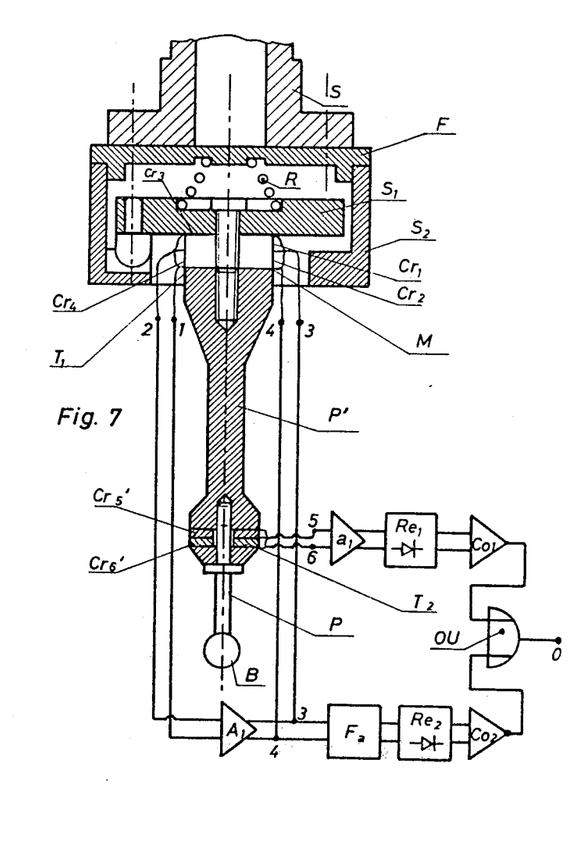
FIG. 7 is a longitudinal section through a measuring head according to the invention, comprising a piezoelectric motor M disposed in a housing of the measuring head, a first piezoelectric transducer $T_1$ disposed in the measuring head, and a second piezoelectric transducer $T_2$ associated with a sensor P disposed at the end of a rod P'. An electronic detection system is associated with each transducer.

The design of the head of FIG. 7 corresponds to that of FIG. 4, but the sensor is replaced by a rod P' having at its end a sandwich of piezoelectric crystals Cr5' and Cr6' associated with a sensor P.

Contact detection takes place by means of two separate electronic devices one of which is connected to the output of the amplifier A1 at points 3 and 4, and the other to the crystals Cr5' and Cr6' at the points 5 and 6. The signals produced by these two devices are transmitted to a disjunctive OR circuit.

FIG. 7 shows also the block diagram of the complete detection system, wherein Re1 and Re2 are peak rectifiers, Co1 and Co2 are comparators, Fa is a narrow band active filter a1 is a load amplifier and OU is a disjunctive logic circuit.

The mode of functioning is as follows: At relatively slow and extremely slow measurement velocities, as soon as ball B contacts, the oscillations of the rod P' are damped, change frequency and stop within a time which is negligible for these velocities. The result thereof is that the electronic device connected across the terminals 3 and 4 supplies a signal which appears at the output of the comparator Co2 and of the OR circuit. However, the shock or impact on the ball B is insufficient to cause the crystals Cr5' and Cr6' to generate a piezoelectric voltage such that there immediately appears a signal at the output of comparator Co1.

When the measurement velocity is higher on contact, the damping time of the oscillations is no longer negligible. The result is that the signal at the output of comparator Co2 appears only when the contact point has been passed beyond. The result of this is a measurement error varying with velocity, this being troublesome if the latter is not constant.

The device constituted by the crystals Cr5' and Cr6', the amplifier a1, the rectifier Re1 and the comparator Co1, makes it possible to avoid this disadvantage. In fact, since the shock power increases with the velocity, the voltage generated by the crystals Cr5' and Cr6' at higher velocity impact becomes sufficiently high to cause to appear without delay a signal across the terminals of comparator Co1 and at the output of the disjunctive OR circuit.

It will be noted that in order to pass through the OR gate, the comparators Co1 and Co2 supply a logic signal of the same nature, but that comparator Co1 changes-over when the signal coming from the rectifier Re1 increases above a predetermined value, whereas comparator Co2 does it when the signal coming from the rectifier Re2 decreases below a predetermined value.

Figure 8:
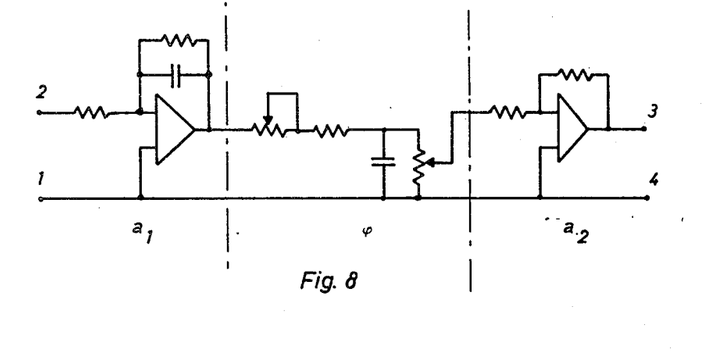
FIG. 8 shows the amplifier circuit A1 of FIGS. 1, 4, 6 and 7.

The electronic parts of the various embodiments are carried into effect in the following manner:

The detail of the amplifier $A_1$ of FIGS. 1, 4, 6 and 7 is shown in FIG. 8, in which: a1 is a load amplifier as described in "Linear Integrated Circuit Application" of G. B. Clayton, pages 34 to 36; $\phi$ is an adjustable dephaser which is carried into effect simply with an adjustable R.C. low-pass filter with gain control; and a2 is an amplifier the power and the amplification of which are adapted to the motor.

Figure 9:
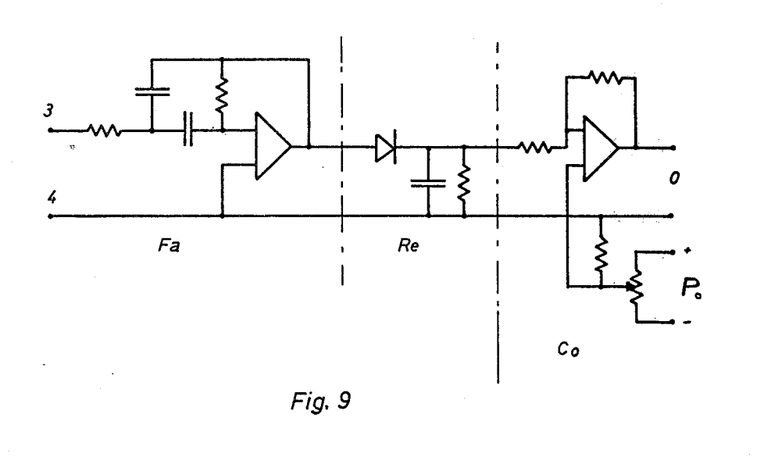
FIG. 9 shows the circuit of the electronic detection system D of FIGS. 1, 4 and 6.

Detail of the signal detector D of FIGS. 1, 4, and 6 is shown in FIG. 9. It comprises a narrow band active filter Fa tuned to the resonant frequency of the oscillator, a peak rectifier Re and a switch Co the threshold of which is adjustable by a potentiometer Po. Switch Co changes-over when the signal coming from rectifier Re decreases below the threshold. The circuity of filter Fa and switch Co are described in: "Integrated Electronics, Millmann-Halkias", pages 556 and 519.

Another solution is to employ the integrated circuit FX-105 of Messrs. Consumer Microcircuit Ltd., Great Britain, described in "Der Elektroniker" No. 7/1975, or other commercially available integrated circuits.

The detail of the elements Re1, Re2, Co1, Co2, Fa et al of the block diagram of FIG. 7 may be obtained from FIGS. 8 and 9.

It is possible to replace (in FIGS. 1, 4, 6 and 7) the monophase motors and transducers by rotating field three-phase systems. It is thus possible to describe a circle at the end of the sensor, thereby obtaining a circular exploration. Parts of such a system, carried into effect with piezoelectric crystals, is shown in FIGS. 10a, 10b and 10c.

Figures 10A, 10B:
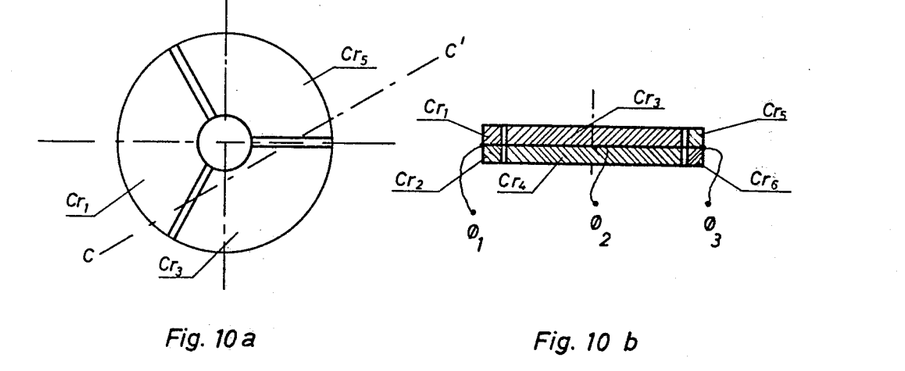
Figure 10C:
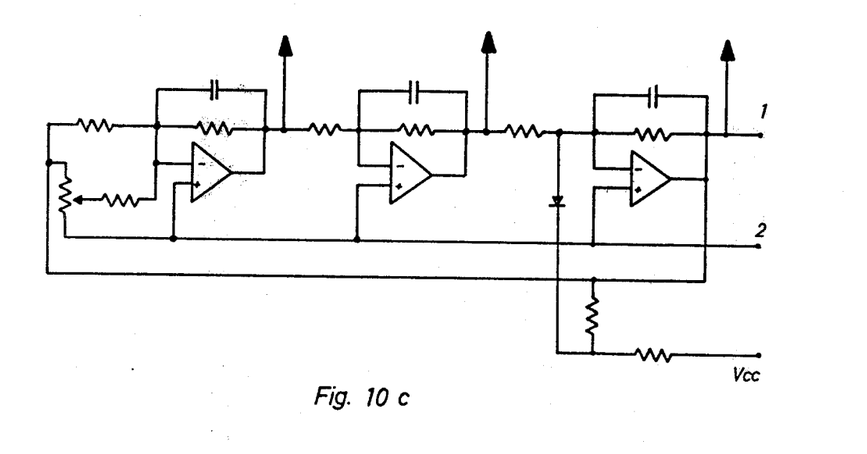

FIGS. 10a, and 10b show the arrangement of the crystals, whereas FIG. 10c shows the diagram of an electronic three-phase generator as may be found in the book by R. Damaye, page 33, "Les Oscillateurs, Générateurs et Conformateurs de signaux", French technical and scientific editions.

For circular sweep versions of the embodiments according to FIGS. 4 and 6, the piezoelectric crystals or sandwiches Cr1, Cr2, Cr3, Cr4 are replaced by the three-phase system Cr1, Cr2, Cr3, Cr4, Cr5, Cr6 and the amplifier A1 by the corresponding electronic portion of FIG. 10c. The signal detector D may be connected between terminals 1 and 2 of FIG. 10c and is according to the device shown in FIG. 9. With regard to the circular sweep version of FIG. 7, the piezoelectric sandwiches Cr1, Cr2, Cr3, Cr4 are replaced by the three-phase system Cr1, Cr2, Cr3, Cr4, Cr5, Cr6, and the amplifier A1 by the corresponding electronic part of FIG. 10c, whereas the sandwich formed by Cr5' and Cr6', disposed at the end of the sensor, and the detection system D remain unchanged.

If, in FIGS. 1, 4 and 6, the feedback loop at the motor input is interrupted it is possible to feed the said motor M by an electronic or electro-mechanical generator the frequency of which corresponds to the intrinsic frequency of the sensor. There can be used, for example, a diapason generator as described in the book by Damaye, "Les Oscillateurs, Générateurs et Conformateurs de signaux", page 99. The detector D will signal the transfer impedance changes due to contact of the sensor. The block diagram will then be that of FIG. 11 and the electrical diagram of the detector D will be according to that of FIG. 9, with or without filter Fa.

Figure 11:
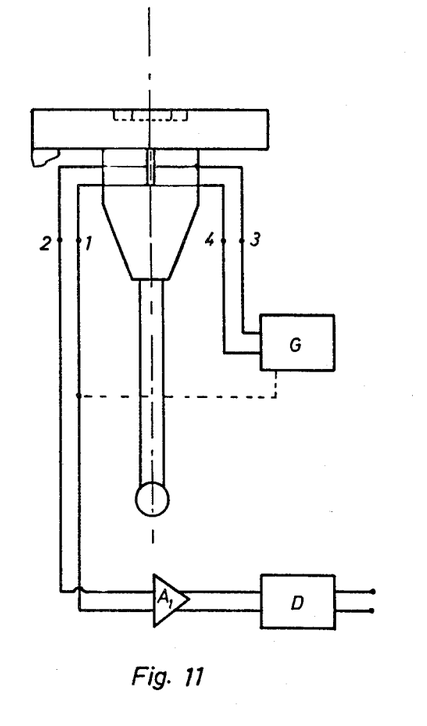
FIG. 11 is a variant of the block diagram of FIGS. 1, 4 and 6 and comprises a generator G.

It may also be envisaged to employ a generator G synchronised on the intrinsic frequency of the sensor P, if it is itself controlled by the voltage emitted by the transducer T on the support. Such a connection is indicated by the dotted line.

It is clear that the embodiment forms shown with piezoelectric transducers or motors may be carried into effect by means of electromagnetic or electro-dynamic devices. An example of employment of the latter for maintaining the vibrations of diapasons is described in the book by Damaye, "Les Oscillateurs, Générateurs et Conformateurs de signaux", on pages 99, 101 and 109.

In view of the circuitry miniaturisation achievable with modern electronics, the circuits of the various block diagrams may be disposed in the measurement head itself. Consequently, it may be found to be advantageous to be able to transmit the output signal of the detection system D or of the disjunctive OR circuit by wireless means to a measurement system. It is possible to effect transmission by radioelectrical waves, by optical means or by ultra-sound, as indicated in FIG. 1.

We claim:

1. Contact sensing head for a position determining system comprising:
    (a) a support structure;
    (b) a sensor having a free end provided for contacting an object to be measured which is able to vibrate at a given frequency and an end attached to the support structure;
    (c) means for determining the position of said free end at the moment where said contact is detected; and
    (d) means for detecting the mechanical contact between the free end of the sensor and said object to be measured, the means for detecting comprising means for causing said free end to transversely vibrate at low amplitude at said given frequency, a transducer for transforming the vibrations of said sensor into a corresponding electrical signal, and means for detecting any disturbance of said signal from said transducer caused by said mechanical contact.

2. Sensing head as claimed in claim 1, wherein said means for causing said free end to transversely vibrate is an electromagnetic motor.

3. Sensing head as claimed in claim 1, wherein said means for causing said free end to transversely vibrate is a piezoelectric motor.

4. Sensing head as claimed in claim 1, wherein said means for causing said free end to transversely vibrate is an electro-dynamic motor.

5. Sensing head as claimed in claim 1, wherein said transducer is an electromagnetic transducer.

6. Sensing head as claimed in claim 1, wherein said transducer is a piezoelectric transducer.

7. Sensing head as claimed in claim 1, wherein said transducer is an electro-dynamic transducer.

8. Sensing head as claimed in claim 1, wherein said means for causing said free end to transversely vibrate is arranged to be controlled in dependence upon said transducer.

9. Sensing head as claimed in claim 1 wherein the given frequency is a resonant frequency of the sensor, and comprising a generator, tuned to said resonant frequency, for controlling said means for causing said free end to transversely vibrate.

10. Sensing head as claimed in claim 1 wherein the given frequency is a resonant frequency of the sensor, and comprising a generator, synchronized with said resonant frequency, for controlling said means for causing said free end to transversely vibrate.

11. Sensing head as claimed in claim 1, wherein said electronic detection system is sensitive to the frequency of the signal of said transducer.

12. Sensing head as claimed in claim 1, wherein said electronic detection system is sensitive to the amplitude of the signal of said transducer.

13. Sensing head as claimed in claim 1, wherein the arrangement is such that the vibration imparted by said means for causing said free end to transversely vibrate to said sensor will be a planar vibration.

14. Sensing head as claimed in claim 1, wherein the arrangement is such that the vibration imparted by said means for causing said free end to transversely vibrate to said sensor will be a rotary vibration.

15. Sensing head as claimed in claim 1, and comprising a support for said sensor, said means for causing said free end to transversely vibrate and said transducer being secured to said support.

16. Sensing head as claimed in claim 1, wherein said means for causing said free end to transversely vibrate and said transducer are secured to said sensor.

17. Sensing head as claimed in claim 1, and comprising a support for said sensor, said means for causing said free end to transversely vibrate being secured to said support and said transducer being secured to said sensor.

18. Sensing head as claimed in claim 1, and comprising a support, for said sensor, which is a Boys support maintained in equilibrium by a spring.

19. Sensing head as claimed in claim 1, for use in a system for the wireless transmission of an output signal utilizing radio waves.

20. Sensing head as claimed in claim 1, for use in a system for the wireless transmission of an output signal utilizing an optical system.

21. Sensing head as claimed in claim 1, for use in a system of wireless transmission of an output signal utilizing an ultra-sound system.

22. Sensing head as claimed in claim 1 wherein said means for causing is comprised of actuating means for imparting the transverse oscillating movement at the free end of the sensor and generator means for supplying the necessary power to the actuating means.

23. Sensing head as claimed in claim 22 wherein the means for monitoring is comprised of a detector device connected to said transducer and providing a charge signal in response to a modification in the steady state of the electrical signal.

24. Sensing head as claimed in claim 23 wherein said sensor is a rod and further including a means for monitoring the position of said rod.

25. A contact sensing head comprising:
a sensor having a free end which is able to vibrate at a frequency;
a motor operable to cause said free end to vibrate at low amplitude at said frequency;
a first transducer for sensing the vibrations of said sensor;
a second transducer secured to said sensor; and
a support for said sensor, said motor and said first transducer being secured to said support.

26. The method of claim 25 wherein the contact sensing head is comprised of a supporting structure which forms a part of the second reference, a sensor rigidly attached at one end to the supporting structure and provided with a calibrated tip at its free end, an actuating means imparting transverse oscillating movement to the calibrated tip, generator means for supplying the necessary power to the actuating means, at least one transducer transforming the oscillating amplitude and frequency of the calibrated tip into an equivalent electrical signal, and a detector device connected each said transducer, each detector providing a signal in response to modification of a previous stationary state of the oscillating movement of the free end of the sensor rod.

27. A method of measuring the positions of points on an object attached to a first reference with regard to a contact sensing head attached to a second reference, the relative positions of the first and second references being measurable by a measuring system of a machine in a third and common reference of origin, said method comprising:
  (a) vibrating the contact sensing head;
  (b) bringing the object into contact with the vibrating contact sensing head;
  (c) perturbating the vibrations of the contact sensing head;
  (d) detecting the perturbations;
  (e) signaling the perturbations;
  (f) recording the coordinates indicated by the measuring system of the machine in the common reference of origin at the instant of signaling of the perturbations; and
  (g) determining the location of the points in the first reference at which the perturbations occurred.

28. Contacting sensing head for a position determining system comprising:
  (a) a support structure;
  (b) a sensor having a free end which is able to vibrate at a given frequency and an end attached to the support structure;
  (c) means for causing said free end to transversely vibrate at low amplitude at said given frequency;
  (d) a first transducer for transforming the vibrations of said sensor into a corresponding electrical signal;
  (e) means for monitoring contact of the free end with an object, said means for monitoring comprising means for monitoring the electrical signal and means for indicating a change in a steady state of the electrical signal whereby contact between the sensor and the object changes the frequency and amplitude of vibrations of the sensor thereby changing the corresponding electrical signal and indicating contact;
  (f) a support for said sensor, said means for causing the free end to transversely vibrate and the first transducer being secured to said support; and
  (g) a second transducer secured to said sensor.

* * * * *